(12) United States Patent
Sim et al.

(10) Patent No.: US 10,794,308 B2
(45) Date of Patent: Oct. 6, 2020

(54) APPARATUS AND METHOD FOR CONTROLLING DEACTIVATION OF CYLINDERS IN ENGINE

(71) Applicants: Hyundai Motor Company, Seoul (KR); Kia Motors Corporation, Seoul (KR); Kumoh National Institute of Technology Industry—Academic Cooperation Foundation, Gumi-si (KR)

(72) Inventors: Ki Seon Sim, Suwon-si (KR); Gee Wook Shin, Hwaseong-si (KR); Myung Sik Choi, Seoul (KR); Won Gyu Kim, Seoul (KR); Young Hong Kwak, Suwon-si (KR); Kyoung Seok Park, Gumi-si (KR)

(73) Assignees: Hyundai Motor Company, Seoul (KR); Kia Motors Corporation, Seoul (KR); Kumoh National Institute of Technology Industry-Academic Cooperation Foundation, Gumi-si (KR)

( * ) Notice: Subject to any disclaimer, the term of this patent is extended or adjusted under 35 U.S.C. 154(b) by 0 days.

(21) Appl. No.: 16/203,301

(22) Filed: Nov. 28, 2018

(65) Prior Publication Data
US 2020/0123994 A1 Apr. 23, 2020

(30) Foreign Application Priority Data
Oct. 17, 2018 (KR) .......................... 10-2018-0123988

(51) Int. Cl.
*F02D 13/06* (2006.01)
*F02D 41/00* (2006.01)
(Continued)

(52) U.S. Cl.
CPC ........ *F02D 41/0087* (2013.01); *F01L 1/2416* (2013.01); *F01L 13/0005* (2013.01); *F02D 13/06* (2013.01); *F02D 17/02* (2013.01); *F02D 41/0002* (2013.01); *F01L 2013/001* (2013.01); *F02D 2041/0012* (2013.01); *F02D 2700/058* (2013.01)

(58) Field of Classification Search
CPC .. F01L 13/0005; F02D 41/0087; F02D 13/06; F02D 2041/0012; F02D 17/02; F02D 41/0002
See application file for complete search history.

(56) References Cited

U.S. PATENT DOCUMENTS 9,650,922 B2 * 5/2017 McConville ........ F01L 13/0005
2017/0356314 A1 * 12/2017 McConville ............ F01L 1/047
(Continued)

FOREIGN PATENT DOCUMENTS

KR 10-2016-0065663 A 6/2016

*Primary Examiner* — Long T Tran
(74) *Attorney, Agent, or Firm* — Morgan, Lewis & Bockius LLP

(57) ABSTRACT

An apparatus and method for controlling deactivation of cylinders in an engine may include a sensor that measures pressure inside an intake manifold of the engine, an oil control valve (OCV) that deactivates the cylinders in the engine, and a controller that is configured to control the OCV to deactivate a specific cylinder in the engine, based on the pressure inside the intake manifold.

16 Claims, 8 Drawing Sheets

(51) Int. Cl.
    *F02D 17/02*     (2006.01)
    *F01L 1/24*     (2006.01)
    *F01L 13/00*     (2006.01)

(56) References Cited

U.S. PATENT DOCUMENTS

2017/0370310 A1* 12/2017 Kotwicki ............ F02D 41/1402
2018/0142636 A1* 5/2018 Brennan ............... F02D 41/009
2018/0149100 A1* 5/2018 Shin ..................... F02D 41/123
2018/0230914 A1* 8/2018 McCarthy, Jr. ......... F02D 13/06
2019/0249609 A1* 8/2019 Hiwatashi ............... F02D 28/00

* cited by examiner

APPARATUS AND METHOD FOR CONTROLLING DEACTIVATION OF CYLINDERS IN ENGINE

CROSS-REFERENCE TO RELATED APPLICATION

The present application claims priority to Korean Patent Application No. 10-2018-0123988, filed on Oct. 17, 2018, the entire contents of which is incorporated herein for all purposes by this reference.

BACKGROUND OF THE INVENTION

Field of the Invention

The present invention relates to an apparatus and method for controlling deactivation of cylinders in an engine.

Description of Related Art

In general, the engine of a vehicle includes cylinders in which fuel is burned to generate power, and each cylinder includes an intake valve for supplying a mixture including fuel and an exhaust valve for exhausting the spent mixture.

As a technology for improving fuel efficiency of an engine, an engine cylinder deactivation apparatus has been developed that deactivates some of the cylinders in the engine during a low-load condition in which the vehicle speed is above a predetermined speed or an idle condition in which required power is low, improving the fuel efficiency.

The engine cylinder deactivation apparatus deactivates an intake valve irrespective of rotation of a camshaft to prevent fuel from being injected into a combustion chamber despite the rotation of the camshaft, reducing fuel consumption and power loss caused by friction of a cylinder and thus achieving a considerable level of fuel efficiency.

A conventional engine cylinder deactivation control technology simply deactivates half of all cylinders in an engine during a low-load condition in which the vehicle speed is above a predetermined speed or an idle condition in which required power is low. For example, the conventional engine cylinder deactivation control technology switches an 8-cylinder engine from a default mode in which all of the eight cylinders operate to an ECO mode in which only four cylinders operate, and therefore an improvement in fuel efficiency is insignificant.

Furthermore, since the conventional engine cylinder deactivation control technology performs the mode transition without considering pressure inside an intake manifold that greatly affects an improvement in fuel efficiency of the engine, the improvement in fuel efficiency is insignificant.

Moreover, since the conventional engine cylinder deactivation control technology deactivates only specific cylinders among all the cylinders (cylinders to be deactivated are fixed), there is a difference in operating time among the cylinders, which leads to a variation in wear among the cylinders, degrading the performance of the engine.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method for controlling deactivation of cylinders in an engine, based on pressure inside an intake manifold of the engine without fixing cylinders to be deactivated among all the cylinders in the engine, preventing a variation in wear among the cylinders.

The technical problems to be solved by the present inventive concept are not limited to the aforementioned problems, and any other technical problems not mentioned herein will be clearly understood from the following description by those skilled in the art to which the present invention pertains. Also, it will be easily understood that the aspects and advantages of the present invention may be accomplished by the means set forth in the appended claims and combinations thereof.

According to various aspects of the present invention, an apparatus configured for controlling deactivation of cylinders in an engine may include a sensor that measures pressure inside an intake manifold of the engine, an oil control valve (OCA) that deactivates the cylinders in the engine, and a controller that is configured to control the OCV to deactivate a specific cylinder in the engine, based on the pressure inside the intake manifold.

The controller may set a plurality of reference ranges and the number of cylinders to be deactivated for each reference range and may determine the number of cylinders to be deactivated, based on a reference range in which the pressure inside the intake manifold is included.

The controller may be configured to determine an order in which all the cylinders in the engine are deactivated, to prevent the specific cylinder from being continually deactivated.

The controller may periodically modify the order in which all the cylinders in the engine are deactivated.

The controller may set a plurality of groups based on a firing order of the cylinders in the engine and may periodically modify an order of the groups.

The controller may periodically modify an order in which cylinders in each group are deactivated.

The controller may modify the order in which the cylinders in the group are deactivated, by use of a binary number that periodically increases.

The controller may set four groups for an 8-cylinder engine, based on a firing order of cylinders, wherein each group may include two cylinders, may modify an order of the groups every first period, and may modify an order of cylinders in each group every second period shorter than the first period. In the instant case, the controller may match a four-digit binary number that increases every second period and an order of the groups at the same time point with respect to a digit, may modify an order of cylinders in a corresponding group when a binary number is 1, and may maintain the order of the cylinders in the corresponding group when the binary number is 0.

The controller may set three groups for a 6-cylinder engine, based on a firing order of cylinders, wherein each group may include two cylinders, may modify an order of the groups every first period, and may modify an order of cylinders in each group every second period shorter than the first period. In the instant case, the controller may match a three-digit binary number that increases every second period and an order of the groups at the same time point with respect to a digit, may modify an order of cylinders in a corresponding group when a binary number is 1, and may maintain the order of the cylinders in the corresponding group when the binary number is 0.

The controller may set two groups for a 4-cylinder engine, based on a firing order of cylinders, wherein each group may include two cylinders, may modify an order of the groups every first period, and may modify an order of cylinders in each group every second period shorter than the first period. In the instant case, the controller may match a two-digit binary number that increases every second period and an order of the groups at the same time point with respect to a digit, may modify an order of cylinders in a corresponding group when a binary number is 1, and may maintain the order of the cylinders in the corresponding group when the binary number is 0.

The controller may adjust the number of cylinders to be deactivated, such that the pressure inside the intake manifold is included in a threshold range. In the instant case, the controller may decrease the number of cylinders to be deactivated, when the pressure inside the intake manifold exceeds a maximum reference value, and may increase the number of cylinders to be deactivated, when the pressure inside the intake manifold is less than a minimum reference value.

According to various aspects of the present invention, a method for controlling deactivation of cylinders in an engine may include setting a plurality of reference ranges and the number of cylinders to be deactivated for each reference range, obtaining pressure inside an intake manifold of the engine, determining the number of cylinders to be deactivated, based on a reference range in which the pressure inside the intake manifold is included, and determining and periodically modifying an order in which all the cylinders are deactivated.

Here, the modifying may include setting a plurality of groups based on a firing order of the cylinders in the engine, periodically modifying an order of the groups, and periodically modifying an order in which cylinders in each group are deactivated.

The modifying may include setting four groups for an 8-cylinder engine, based on a firing order of cylinders, wherein each group may include two cylinders, modifying an order of the groups every first period, matching a four-digit binary number that increases every second period shorter than the first period and an order of the groups at the same time point with respect to a digit, and modifying an order of cylinders in a corresponding group when a binary number is 1.

The modifying may include setting three groups for a 6-cylinder engine, based on a firing order of cylinders, wherein each group may include two cylinders, modifying an order of the groups every first period, matching a three-digit binary number that increases every second period shorter than the first period and an order of the groups at the same time point with respect to a digit, and modifying an order of cylinders in a corresponding group when a binary number is 1.

The modifying may include setting two groups for a 4-cylinder engine, based on a firing order of cylinders, wherein each group may include two cylinders, modifying an order of the groups every first period, matching a two-digit binary number that increases every second period shorter than the first period and an order of the groups at the same time point with respect to a digit, and modifying an order of cylinders in a corresponding group when a binary number is 1.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
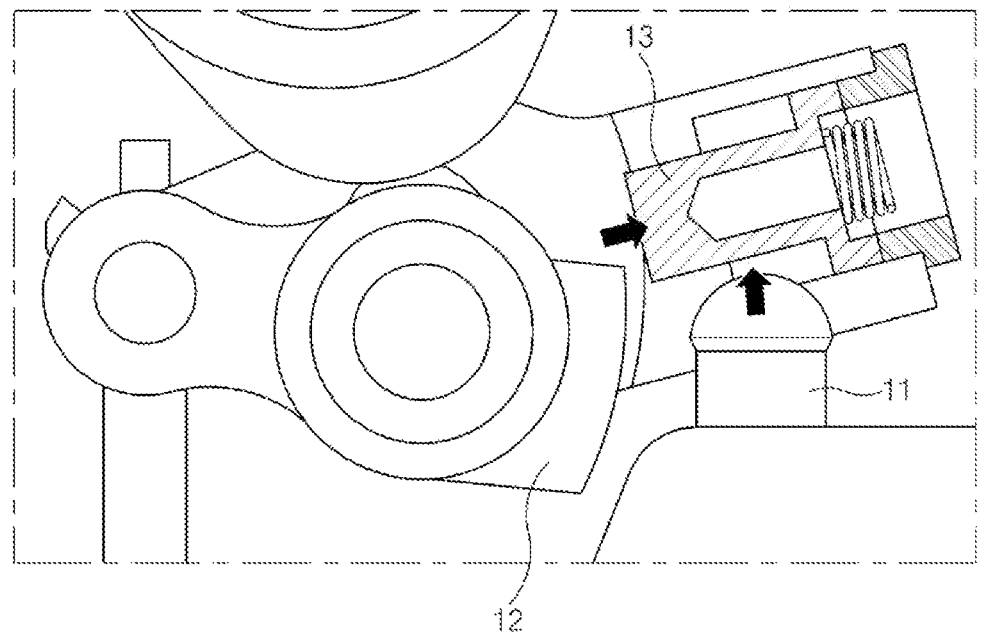
FIG. 1 is a view exemplarily illustrating an operation of an engine cylinder deactivation apparatus used in an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. It may be understood that even if shown in different drawings, identical elements are provided with identical reference numerals in the drawings. Furthermore, in describing the exemplary embodiments of the present invention, detailed descriptions related to well-known functions or configurations will be omitted when they may make subject matters of the present invention unnecessarily obscure.

Terms, such as "first", "second", "A", "B", "(a)", "(b)", and the like, may be used herein to describe elements of the present invention. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a structural view exemplarily illustrating an engine cylinder deactivation apparatus used In an exemplary embodiment of the present invention.

As illustrated in FIG. 1, the engine cylinder deactivation apparatus used In an exemplary embodiment of the present invention may include an oil supply device 11 and a latching pin 13.

When the engine cylinder deactivation apparatus operates to supply high-pressure oil through the oil supply device 11, the latching pin 13 brought into contact with a swing arm 12 by hydraulic pressure moves backward, and therefore valves (an intake valve and an exhaust valve) are not lifted. Consequently, the intake valve and the exhaust valve do not operate so that an air-fuel mixture is not introduced into and exhausted from a cylinder, and thus combustion does not occur in the cylinder.

Figure 2:
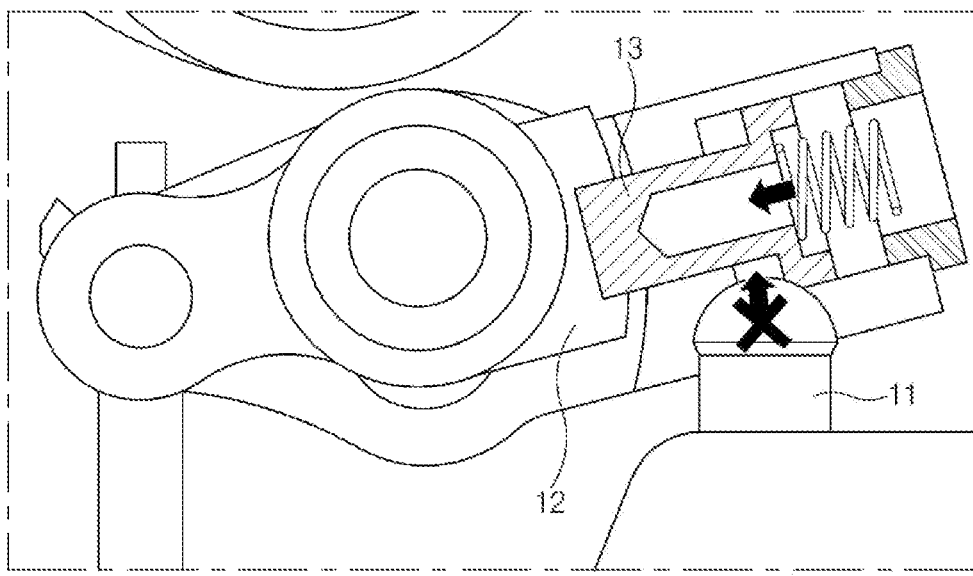
FIG. 2 is a view exemplarily illustrating another operation of the engine cylinder deactivation apparatus used in an exemplary embodiment of the present invention.

When the engine cylinder deactivation apparatus does not operate to block the supply of oil, the latching pin 13, as illustrated in FIG. 2, is moved to the original position by a spring, and therefore the valves (the intake valve and the exhaust valve) are lifted. Consequently, the intake valve and the exhaust valve operate normally so that an air-fuel mixture is introduced into and exhausted from the cylinder, and thus combustion occurs normally in the cylinder.

Figure 3:
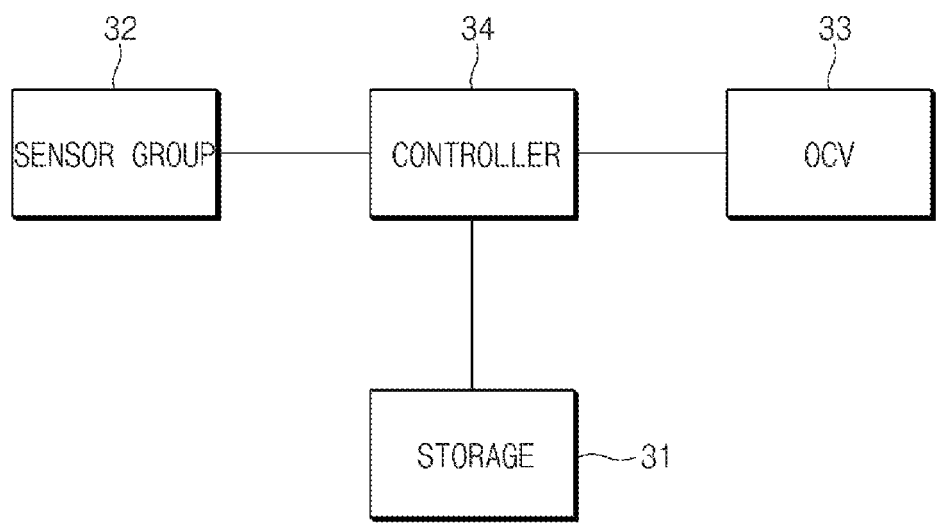
FIG. 3 is a block diagram illustrating a configuration of an engine cylinder deactivation control apparatus according to an exemplary embodiment of the present invention.

FIG. 3 is a block diagram illustrating a configuration of an engine cylinder deactivation control apparatus according to an exemplary embodiment of the present invention.

As illustrated in FIG. 3, the engine cylinder deactivation control apparatus according to an exemplary embodiment of the present invention may include a storage 31, a sensor group 32, an oil control valve (OCV) 33, and a controller 34. According to a method of carrying out the present invention, the components may be integrated, or some of the components may be omitted.

The storage 31 may store logic, an algorithm, and a program for controlling deactivation of cylinders in an engine of a vehicle, based on pressure inside an intake manifold of the engine in a state of the vehicle in which some of the cylinders in the engine may be deactivated, wherein cylinders to be deactivated among all the cylinders are not fixed.

Furthermore, the storage 31 may store a maximum pressure value (a maximum reference value) and a minimum pressure value (a minimum reference value) as reference values for deactivating some of the cylinders in the engine.

Also, the storage 31 may store a plurality of reference ranges for deactivating some of the cylinders in the engine. For example, a first reference range may be greater than or equal to 60 and less than 70, a second reference range may be greater than or equal to 50 and less than 60, and a third reference range may be less than 50.

The storage 31 may include at least one type of storage medium among memories of a flash memory type, a hard disk type, a micro type, and a card type (e.g., a secure digital (SD) card or an eXtream digital (XD) card) and memories of a random access memory (RAM) type, a static RAM (SRAM) type, a read-only memory (ROM) type, a programmable ROM (PROM) type, an electrically erasable PROM (EEPROM) type, a magnetic RAM (MRAM) type, a magnetic disk type, and an optical disk type.

Figure 4:
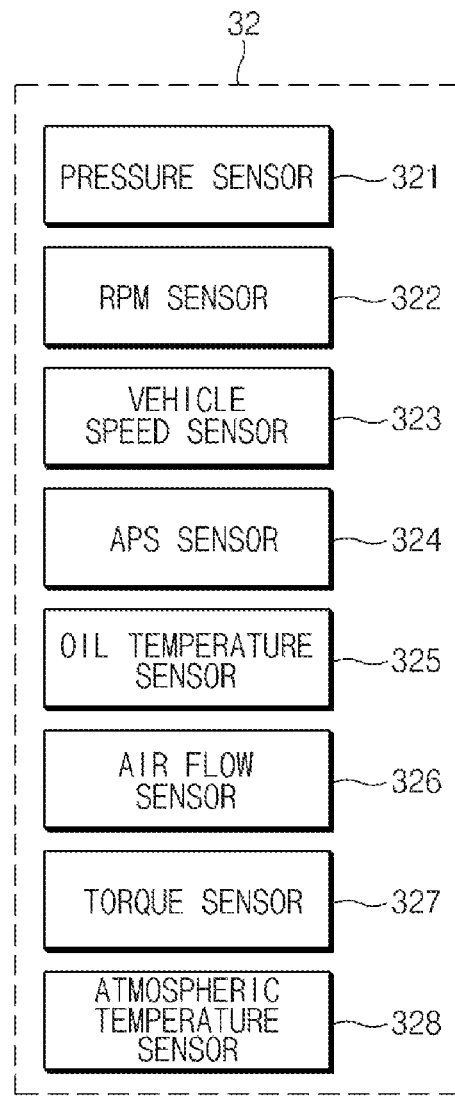
FIG. 4 is a block diagram illustrating various types of sensors included in a sensor group according to an exemplary embodiment of the present invention.

The sensor group 32 includes various types of sensors and outputs various types of sensor data. As illustrated in FIG. 4, the sensor group 32 may include a pressure sensor 321 for measuring the pressure inside the intake manifold, an RPM sensor 322 for measuring the RPM of the engine, a vehicle speed sensor 323 for measuring the speed of the vehicle, an accelerator position sensor (APS) 324 for detecting the degree to which a driver presses an accelerator pedal, an oil temperature sensor 325 for measuring the oil temperature in the engine, an air flow sensor 326 for measuring the air amount flowing into the engine, a torque sensor 327 for detecting torque requirement for the engine, and an atmospheric temperature sensor 328 for measuring the atmospheric temperature.

The OCV 33 supplies or blocks high-pressure oil for moving the latching pin 13.

The controller 34 performs overall control to enable the components to perform functions thereof normally. The controller 34 may be implemented in a hardware or software form, or may be implemented in a form in which hardware and software are combined. The controller 34 may be preferably implemented with, but is not limited to, a microprocessor.

The controller 34 may control the components to control deactivation of the cylinders in the engine of the vehicle, based on the pressure inside the intake manifold of the engine in a state of the vehicle in which some of the cylinders may be deactivated, wherein cylinders to be deactivated among all the cylinders are not fixed.

Figure 5:
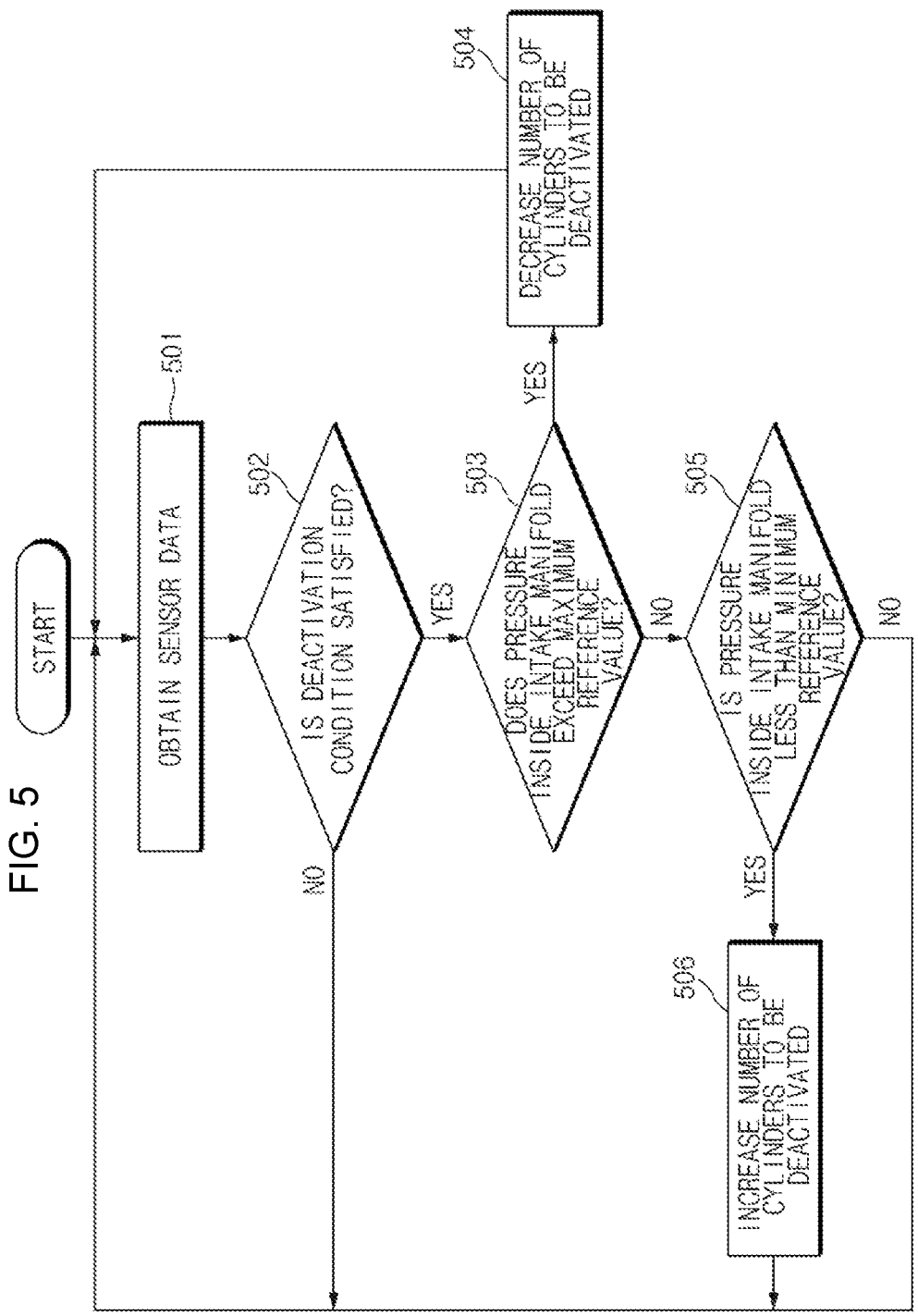
FIG. 5 is a flowchart illustrating a method of controlling deactivation of cylinders based on pressure inside an intake manifold according to various exemplary embodiments of the present invention.

Hereinafter, a method of controlling deactivation of the cylinders by the controller 34 based on the pressure inside the intake manifold according to various exemplary embodiments will be described with reference to FIG. 5.

The controller 34 obtains various types of sensor data through the sensor group 32 (Step 501).

Based on the obtained sensor data, the controller 34 determines whether a deactivation condition is satisfied (Step 502). That is, the controller 34 determines whether the vehicle is in a state in which some of the cylinders in the engine may be deactivated.

When the determination result in step 502 shows that the deactivation condition is not satisfied, the controller 34 proceeds to step 501, and when the determination result in step 502 shows that the deactivation condition is satisfied, the controller 34 determines whether the pressure inside the intake manifold, among the sensor data obtained by the sensor group 32, exceeds the maximum reference value (Step 503).

When the determination result in step 503 shows that the pressure inside the intake manifold exceeds the maximum reference value, the controller 34 decreases the number of cylinders to be deactivated (Step 504) and then proceeds to step 501, and when the determination result in step 503 shows that the pressure inside the intake manifold does not exceed the maximum reference value, the controller 34 determines whether the pressure inside the intake manifold is less than the minimum reference value (Step 505). Here, decreasing the number of cylinders to be deactivated means, for example, changing a state in which two cylinders are deactivated to a state in which one cylinder is deactivated. That is, decreasing the number of cylinders to be deactivated means activating deactivated cylinders.

When the determination result in step 505 shows that the pressure inside the intake manifold is not less than the minimum reference value, the controller 34 proceeds to step 501, and when the determination result in step 505 shows that the pressure inside the intake manifold is less than the minimum reference value, the controller 34 increases the number of cylinders to be deactivated and then proceeds to step 501.

According to the various exemplary embodiments of the present invention, the fuel efficiency of the engine may be improved by determining the threshold range (the maximum reference value and the minimum reference value) for the pressure inside the intake manifold and then adjusting the number of cylinders to be deactivated, such that the current pressure inside the intake manifold is included in the threshold range.

Figure 6:
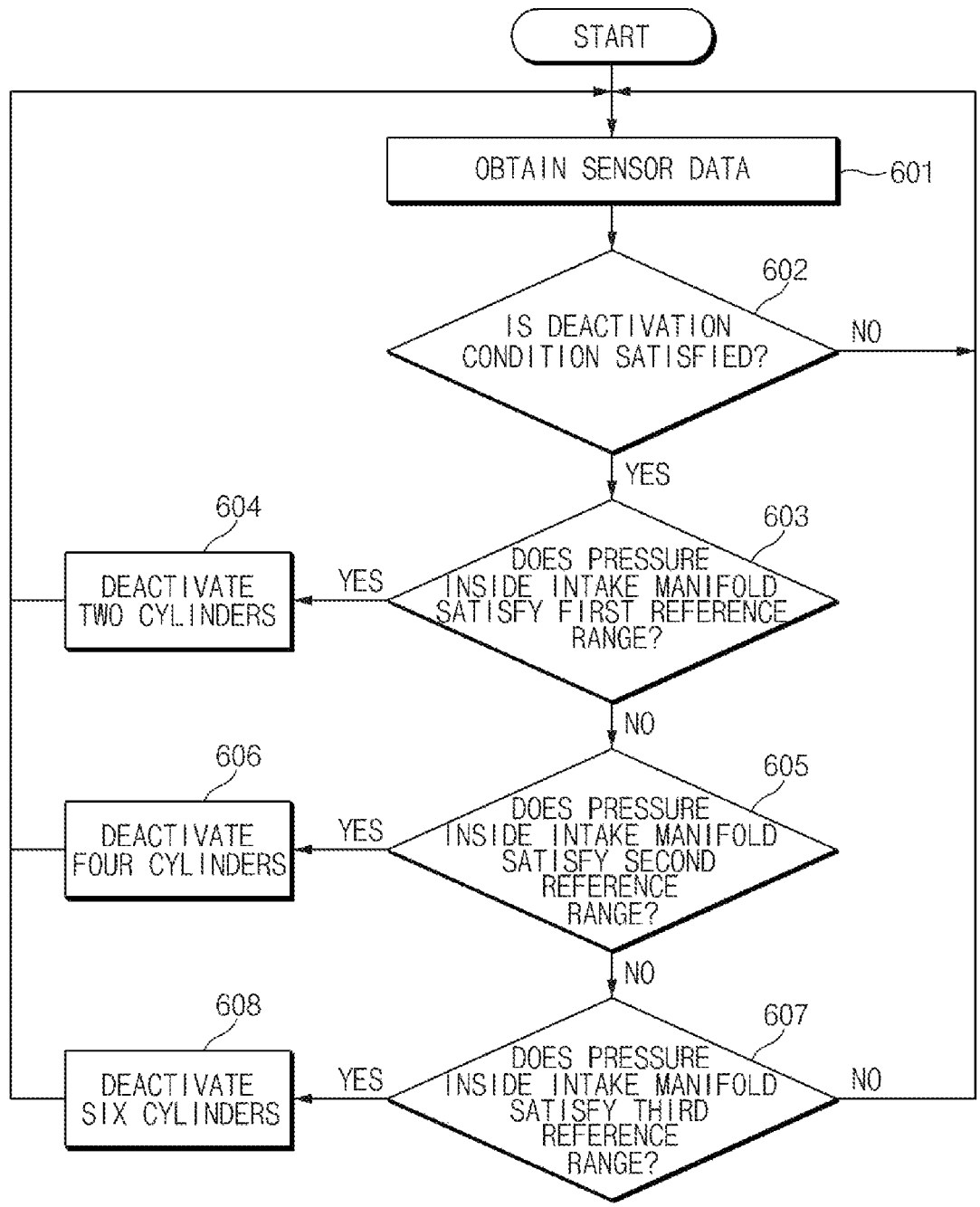
FIG. 6 is a flowchart illustrating a method of controlling deactivation of cylinders based on pressure inside an intake manifold according to various exemplary embodiments of the present invention.

Hereinafter, a method of controlling deactivation of the cylinders by the controller 34 based on the pressure inside the intake manifold according to various exemplary embodiments will be described with reference to FIG. 6.

The controller 34 obtains various types of sensor data through the sensor group 32 (Step 601).

Based on the obtained sensor data, the controller 34 determines whether a deactivation condition is satisfied (Step 602). That is, the controller 34 determines whether the vehicle is in a state in which some of the cylinders in the engine may be deactivated.

When the determination result in step 602 shows that the deactivation condition is not satisfied, the controller 34 proceeds to step 601, and when the determination result in step 602 shows that the deactivation condition is satisfied, the controller 34 determines whether the pressure inside the intake manifold, among the sensor data obtained by the sensor group 32, is in a first reference range (Step 603).

When the determination result in step 603 shows that the pressure inside the intake manifold is included in the first reference range, the controller 34 deactivates, for example, two cylinders (Step 604) and then proceeds to step 601, and when the determination result in step 603 shows that the pressure inside the intake manifold is not included in the first reference range, the controller 34 determines whether the pressure inside the intake manifold is included in a second reference range (Step 605).

When the determination result in step 605 shows that the pressure inside the intake manifold is included in the second reference range, the controller 34 deactivates, for example, four cylinders (Step 606) and then proceeds to step 601, and when the determination result in step 605 shows that the pressure inside the intake manifold is not included in the second reference range, the controller 34 determines whether the pressure inside the intake manifold is included in a third reference range (Step 607).

When the determination result in step 607 shows that the pressure inside the intake manifold is included in the third reference range, the controller 34 deactivates, for example, six cylinders (Step 608) and then proceeds to step 601, and when the determination result in step 607 shows that the pressure inside the intake manifold is not included in the third reference range, the controller 34 immediately proceeds to step 601.

According to the various exemplary embodiments of the present invention, the fuel efficiency of the engine may be improved by maintaining the current pressure inside the intake manifold at constant pressure by previously setting the plurality of reference ranges for the pressure inside the intake manifold and setting the number of cylinders to be deactivated for each reference range.

In the various exemplary embodiments of the present invention, two, four, or six cylinders may be deactivated according to circumstances. In these cases, it is necessary to consider which cylinders are deactivated and in what order the cylinders are deactivated.

Hereinafter, a method of determining cylinders to be deactivated will be described in detail with reference to FIGS. 7 and 8. An 8-cylinder engine, a 6-cylinder engine, a 4-cylinder engine, and a 3-cylinder engine will be separately described.

Figure 7:
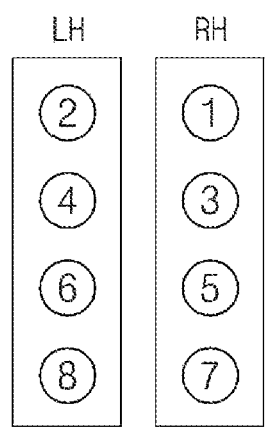
FIG. 7 is a view exemplarily illustrating a cylinder structure of an 8-cylinder engine used in an exemplary embodiment of the present invention.

FIG. 7 is a view exemplarily illustrating a cylinder structure of an 8-cylinder engine used in an exemplary embodiment of the present invention.

As illustrated in FIG. 7, cylinders in the 8-cylinder engine used In an exemplary embodiment of the present invention are divided into right-hand (RH) cylinders and left-hand (LH) cylinders. The RH cylinders are sequentially numbered 1, 3, 5, and 7, and the LH cylinders are sequentially numbered 2, 4, 6, and 8. A 6-cylinder engine has a structure in which cylinders 7 and 8 are removed from the 8-cylinder engine. A 4-cylinder engine has a structure in which four cylinders are arranged in series. The four cylinders are sequentially numbered 1, 2, 3, and 4. A 3-cylinder engine has a structure in which three cylinders are arranged in series. The three cylinders are sequentially numbered 1, 2, and 3.

Figure 8:
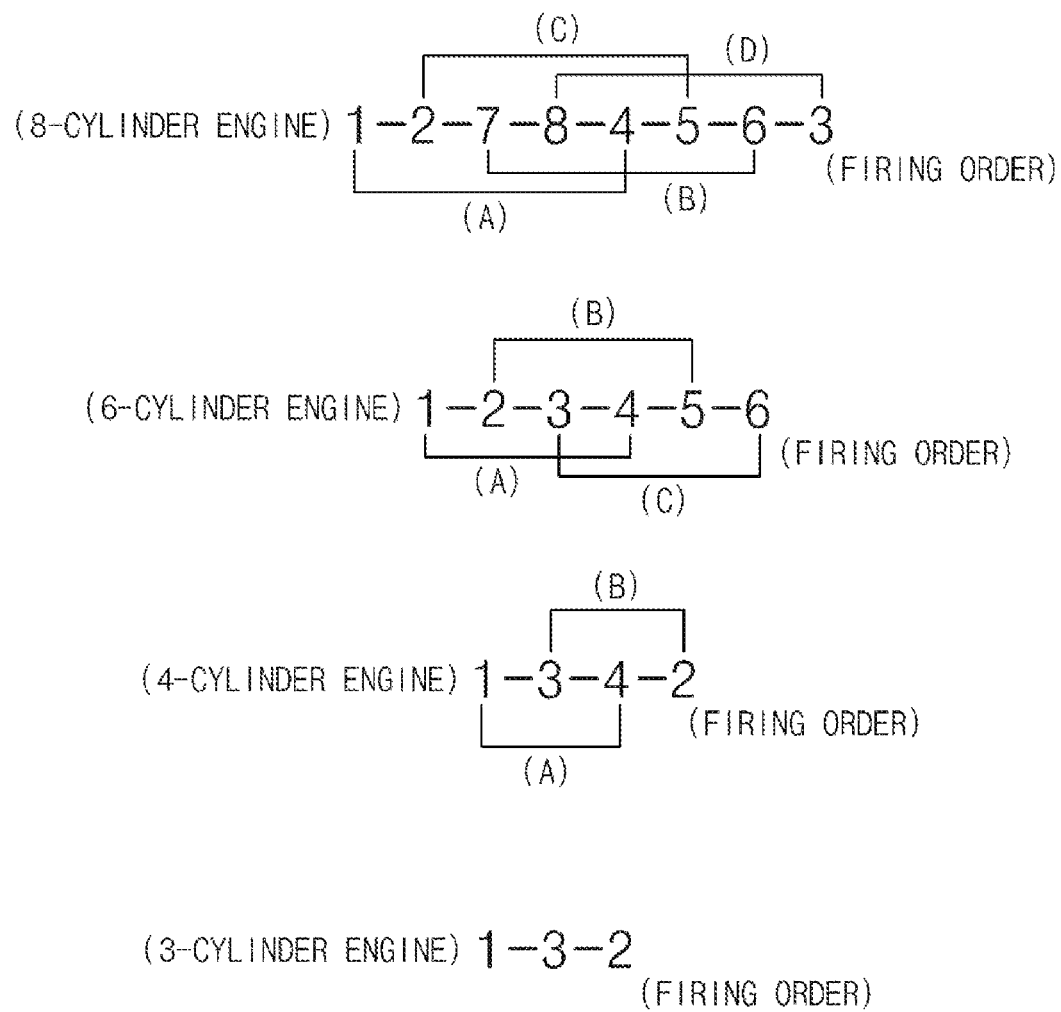
FIG. 8 is a view exemplarily illustrating firing orders and groups of cylinders in engines according to an exemplary embodiment of the present invention.

FIG. 8 is a view exemplarily illustrating firing orders and groups of cylinders in engines according to an exemplary embodiment of the present invention.

As illustrated in FIG. 8, an 8-cylinder engine has a firing order of 1-2-7-8-4-5-6-3, a 6-cylinder engine has a firing order of 1-2-3-4-5-6, a 4-cylinder engine has a firing order of 1-3-4-2, and a 3-cylinder engine has a firing order of 1-3-2. A method of setting groups in view of the firing orders is as follows.

In the case of the 8-cylinder engine, cylinders "1-4" are set as group A, cylinders "7-6" are set as group B, cylinders "2-5" are set as group C, and cylinders "8-3" are set as group D. The order of numbers in each group matches the firing order. That is, in group A, 1 is ahead of 4. In setting the groups, group A may not be set as "4-1" without considering the firing order.

In the case of the 6-cylinder engine, cylinders "1-4" are set as group A, cylinders "2-5" are set as group B, and cylinders "3-6" are set as group C.

In the case of the 4-cylinder engine, cylinders "1-4" are set as group A, and cylinders "3-2" are set as group B.

In the case of the 3-cylinder engine, a separate group is not set.

The order of the groups is periodically modified to prevent a specific cylinder from being continuously deactivated.

In the case of the 8-cylinder engine, a total of 8 orders continually circulate every 10 ms. In determining the order of the groups, groups A and B may be set adjacent to each other and groups C and D may be set adjacent to each other in view of the safety of the engine. For example, the order of the groups is determined to be "A-B-C-D" at the present point (at 0 ms), "A-B-D-C" at 10 ms, "B-A-C-D" at 20 ms, "B-A-D-C" at 30 ms, "C-D-A-B" at 40 ms, "D-C-A-B" at 50 ms, "C-D-B-A" at 60 ms, and "D-C-B-A" at 70 ms. The order of THE groups at 80 ms returns to the initial group order.

In the case of the 6-cylinder engine, a total of 6 orders continually circulate every 10 ms. For example, the order of the groups is determined to be "A-B-C" at the present point (at 0 ms), "A-C-B" at 10 ms, "B-A-C" at 20 ms, "B-C-A" at 30 ms, "C-A-B" at 40 ms, and "C-B-A" at 50 ms.

In the case of the 4-cylinder engine, a total of 2 orders continually circulate every 10 ms. For example, the order of the groups is determined to be "A-B" at the present point (at 0 ms) and "B-A" at 10 ms.

In the case of the 3-cylinder engine, a total of 3 cylinder orders continually circulate since no group is set. For example, the order of the cylinders is determined to be "1-2-3" at the present point (at 0 ms), "1-3-2" at 10 ms, and "2-1-3" at 20 ms.

Since the 8-cylinder engine, the 6-cylinder engine, and the 4-cylinder engine each have the set groups as described above, all the cylinders may be more equivalently deactivated by modifying the order of the groups and the order of cylinders in each group.

Hereinafter, a method of modifying the order of cylinders in groups will be described in detail. The order of the cylinders in the groups may be basically modified every 1 ms by use of a binary number that increases every 1 ms.

In the case of the 8-cylinder engine, a four-digit binary number corresponding to the number of groups may be used: 0-0-0-0 at the present point (at 0 ms), 0-0-0-1 at 1 ms, 0-0-1-0 at 2 ms, 0-0-1-1 at 3 ms, 0-1-0-0 at 4 ms, 0-1-0-1 at 5 ms, 0-1-1-0 at 6 ms, 0-1-1-1 at 7 ms, 1-0-0-0 at 8 ms, 1-0-0-1 at 9 ms, 1-0-1-0 at 10 ms, 1-0-1-1 at 11 ms, 1-1-0-0 at 12 ms, 1-1-0-1 at 13 ms, 1-1-1-0 at 14 ms, and 1-1-1-1 at 15 ms. A. At 16 ms, the four-digit binary number returns to the initial value 0-0-0-0. That is, the four-digit binary number is initialized every 16 ms.

In the case of the 6-cylinder engine, a three-digit binary number corresponding to the number of groups may be used: 0-0-0 at the present point (at 0 ms), 0-0-1 at 1 ms, 0-1-0 at 2 ms, 0-1-1 at 3 ms, 1-0-0 at 4 ms, 1-0-1 at 5 ms, 1-1-0 at 6 ms, and 1-1-1 at 7 ms. A. At 8 ms, the three-digit binary number returns to the initial value 0-0-0. That is, the three-digit binary number is initialized every 8 ms.

In the case of the 4-cylinder engine, a two-digit binary number corresponding to the number of groups may be used: 0-0 at the present point (at 0 ms), 0-1 at 2 ms, and 1-1 at 3 ms. A. At 4 ms, the two-digit binary number returns to the initial value 0-0. That is, the two-digit binary number is initialized every 4 ms.

The order of the cylinders in the groups is modified by use of the binary number determined. In the instant case, 0 does not modify the order of cylinders in a corresponding group, and 1 modifies the order of the cylinders in the corresponding group.

For example, at 5 ms with respect to the present point (0 ms), the order of the groups of the 8-cylinder engine is A-B-C-D, that is, (1-4)-(7-6)-(2-5)-(8-3), and the order of the cylinders in the groups is 0-1-0-1. The first digit (0), the second digit (1), the third digit (0), and the fourth digit (1) of the binary number are applied to groups A to D, respectively.

Since the first digit (0) applied to group A does not modify the order, the order of the cylinders in group A is 1-4 as it is. Since the second digit (1) applied to group B modifies the order, the order of the cylinders in group B is 6-7. Since the third digit (0) applied to group C does not modify the order, the order of the cylinders in group C is 2-5 as it is. Since the fourth digit (1) applied to group D modifies the order, the order of the cylinders in group D is 3-8.

Consequently, the order of the cylinders to be deactivated in the 8-cylinder engine is 1-4-6-7-2-5-3-8. In the case of deactivating two cylinders, cylinder 1 and cylinder 4 are deactivated. In the case of deactivating four cylinders, cylinder 1, cylinder 4, cylinder 6, and cylinder 7 are deactivated. In the case of deactivating six cylinders, cylinder 1, cylinder 4, cylinder 6, cylinder 7, cylinder 2, and cylinder 5 are deactivated.

Meanwhile, the controller 34 may control a fuel injector for injecting fuel, an igniter for exploding fuel in a cylinder, a Continuous Variable Valve Timing (CVVT) controller for controlling timing of valve lift, and a throttle valve for controlling the air amount flowing into an engine.

Figure 9:
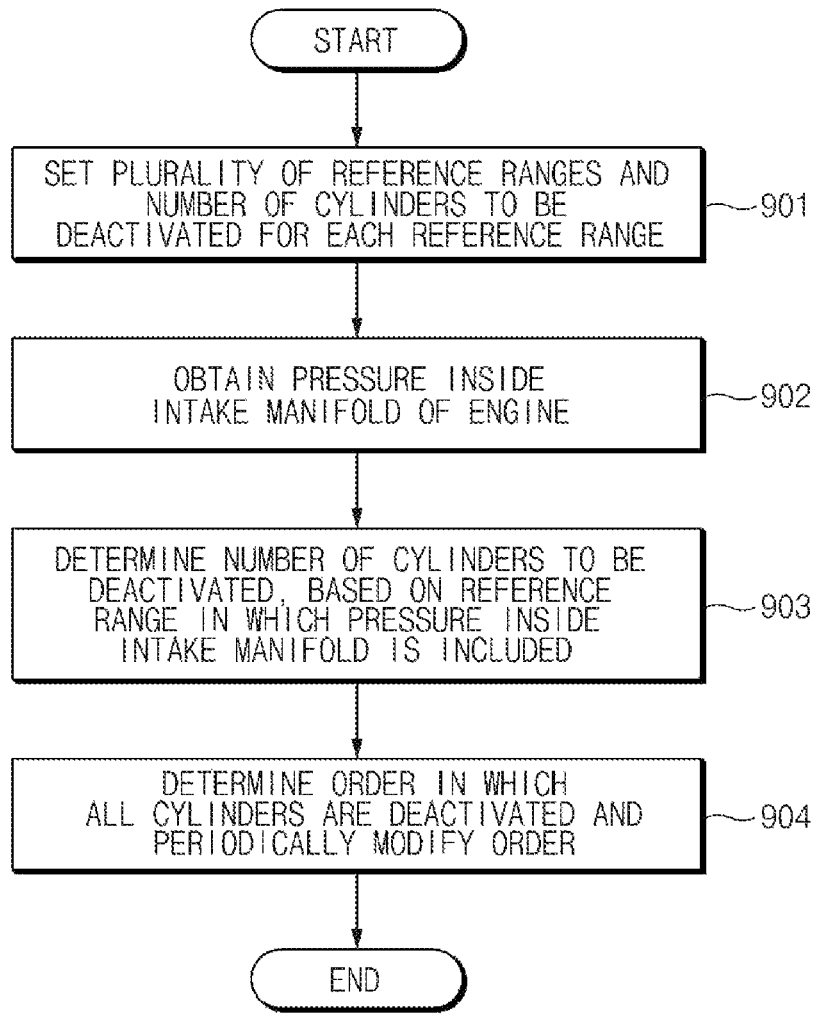
FIG. 9 is a flowchart illustrating a method of controlling deactivation of cylinders in an engine according to an exemplary embodiment of the present invention.

FIG. 9 is a flowchart illustrating a method of controlling deactivation of cylinders in an engine according to an exemplary embodiment of the present invention, where FIG. 9 illustrates a process performed by the controller 34.

First, the controller 34 sets a plurality of reference ranges and the number of cylinders to be deactivated for each reference range (Step 901).

Next, the controller 34 obtains pressure inside an intake manifold of the engine (Step 902).

As such, the controller 34 determines the number of cylinders to be deactivated, based on a reference range in which the pressure inside the intake manifold is included (Step 903).

After that, the controller 34 determines the order in which all the cylinders in the engine are deactivated and periodically modifies the order (Step 904). Step 904 may be performed before or after step 901, or may be performed at the time when the engine cylinder deactivation control apparatus according to an exemplary embodiment of the present invention starts to operate.

According to an exemplary embodiment of the present invention, the deactivation of the cylinders in the engine is controlled based on the pressure inside the intake manifold of the engine without fixing cylinders to be deactivated among all the cylinders in the engine, having an advantageous effect of preventing a variation in wear among the cylinders.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for controlling deactivation of cylinders in an engine, the apparatus comprising:
a sensor configured to measure pressure inside an intake manifold of the engine;
an oil control valve (OCV) configured to deactivate the cylinders in the engine; and
a controller configured to control the OCV to deactivate a predetermined cylinder among the cylinders in the engine, based on the pressure inside the intake manifold,
wherein the controller is configured to:
set a plurality of reference ranges and a number of cylinders to be deactivated for each reference range of the plurality of reference ranges; and
determine a number of cylinders to be deactivated, based on a reference range in which the pressure inside the intake manifold is included,
wherein the controller is configured to determine an order in which all the cylinders in the engine are deactivated, to prevent the predetermined cylinder from being continually deactivated, and
wherein the controller is configured to periodically modify the order in which all the cylinders in the engine are deactivated.

2. The apparatus of claim 1, wherein the controller is configured to:
set a plurality of groups based on a firing order of the cylinders in the engine; and
periodically modify an order of the plurality of groups.

3. The apparatus of claim 2, wherein the controller is configured to:
periodically modify an order in which cylinders in each group of the plurality of groups are deactivated.

4. The apparatus of claim 3, wherein the controller is configured to:
modify the order in which the cylinders in each group are deactivated, by use of a binary number that periodically increases.

5. The apparatus of claim 4, wherein the controller is configured to:
set four groups for an 8-cylinder engine, based on a firing order of the cylinders, wherein each group of the four groups includes two cylinders;
modify an order of the four groups every first period; and
modify an order of the cylinders in each group of the four groups every second period shorter than the first period.

6. The apparatus of claim 5, wherein the controller is configured to:
match a four-digit binary number that increases every second period and the order of the four groups at a same time point with respect to a digit;
modify the order of the cylinders in a corresponding group when a binary number is 1; and
maintain the order of the cylinders in a corresponding group when the binary number is 0.

7. The apparatus of claim 4, wherein the controller is configured to:
set three groups for a 6-cylinder engine, based on a firing order of the cylinders, wherein each group of the three groups includes two cylinders;
modify an order of the three groups every first period; and
modify an order of the cylinders in each group of the three groups every second period shorter than the first period.

8. The apparatus of claim 7, wherein the controller is configured to:
match a three-digit binary number that increases every second period and the order of the three groups at a same time point with respect to a digit;
modify the order of the cylinders in a corresponding group when a binary number is 1; and
maintain the order of the cylinders in a corresponding group when the binary number is 0.

9. The apparatus of claim 4, wherein the controller is configured to:
set two groups for a 4-cylinder engine, based on a firing order of the cylinders, wherein each group of the two groups includes two cylinders;
modify an order of the two groups every first period; and
modify an order of the cylinders in each group of the two groups every second period shorter than the first period.

10. The apparatus of claim 9, wherein the controller is configured to:
match a two-digit binary number that increases every second period and the order of the two groups at a same time point with respect to a digit;
modify the order of the cylinders in a corresponding group when a binary number is 1; and
maintain the order of the cylinders in a corresponding group when the binary number is 0.

11. The apparatus of claim 1, wherein the controller is configured to:
adjust a number of cylinders to be deactivated, such that the pressure inside the intake manifold is included in a threshold range.

12. The apparatus of claim 11, wherein the controller is configured to:
decrease a number of the cylinders to be deactivated, when the pressure inside the intake manifold exceeds a maximum reference value; and
increase the number of the cylinders to be deactivated, when the pressure inside the intake manifold is less than a minimum reference value.

13. A method of controlling deactivation of cylinders in an engine, the method comprising:
setting, by a controller, a plurality of reference ranges and a number of the cylinders to be deactivated for each reference range of the plurality of reference ranges;
obtaining, by the controller, pressure inside an intake manifold of the engine;
determining, by the controller, the number of cylinders to be deactivated, based on a reference range in which the pressure inside the intake manifold is included; and
setting, by the controller, a plurality of groups based on a firing order of the cylinders in the engine and periodically modifying an order of the groups and an order in which cylinders in each group are deactivated.

14. The method of claim 13, wherein the modifying of the order of the groups and the order in which cylinders in each group are deactivated includes:
setting four groups for an 8-cylinder engine, based on a firing order of the cylinders, wherein each group of the four groups includes two cylinders;
modifying an order of the four groups every first period;
matching a four-digit binary number that increases every second period shorter than the first period and the order of the four groups at a same time point with respect to a digit; and modifying an order of the cylinders in a corresponding group when a binary number is 1.

15. The method of claim 13, wherein the modifying of the order of the groups and the order in which cylinders in each group are deactivated includes:

setting three groups for a 6-cylinder engine, based on a firing order of the cylinders, wherein each group of the three groups includes two cylinders;

modifying an order of the three groups every first period;

matching a three-digit binary number that increases every second period shorter than the first period and the order of the three groups at a same time point with respect to a digit; and modifying an order of the cylinders in a corresponding group when a binary number is 1.

16. The method of claim 13, wherein the modifying of the order of the groups and the order in which cylinders in each group are deactivated includes:

setting two groups for a 4-cylinder engine, based on a firing order of the cylinders, wherein each group of the two groups includes two cylinders;

modifying an order of the two groups every first period;

matching a two-digit binary number that increases every second period shorter than the first period and the order of the two groups at a same time point with respect to a digit; and modifying an order of the cylinders in a corresponding group when a binary number is 1.

\* \* \* \* \*